Patented Feb. 27, 1945

2,370,421

UNITED STATES PATENT OFFICE 2,370,421

TREATMENT OF OIL WELLS

Cortes F. Reed, Anoka, Minn., assignor to Charles L. Horn, Minneapolis, Minn.

No Drawing. Application March 20, 1942,
Serial No. 435,591

5 Claims. (Cl. 252—8.55)

This invention pertains to the treatment of wells and to compositions therefor. More particularly, it relates to the treatment of oil, gas, water or brine wells for the purpose of increasing the production of such wells. Still more particularly it relates to the treatment of wells of the character described with aqueous mineral acid solutions containing as an assisting agent a mixture of primary and secondary alkane sulfonic acids of at least 6 carbon atoms. The invention also relates to well treating compositions of the above type.

This invention has for an object the provision of new and useful compositions for treating wells. A further object is to increase the production of wells. A further object is to provide new and useful procedures for treating wells. Another object is to provide well treating compositions which can be easily and quickly prepared. Yet another object is to provide well treating compositions which require no precautions for use. A still further object is to provide oil well treating compositions which remain stable on standing. Other objects will be apparent from the following description of the invention.

It has been found that the above objects may be attained and the art of treating wells advanced by the preparation and use in treating wells of an aqueous acid composition containing a water-soluble salt of a mixture of primary and secondary saturated hydrocarbon mono and poly-sulfonic acids and chlorohydrocarbon sulfonic acids having an average of at about 6 carbon atoms in the molecule.

In a more limited sense the invention relates to the preparation and use of aqueous well treating compositions comprising a strong mineral acid and a mixture of water-soluble alkali metal, ammonium or amino salts of primary and secondary saturated hydrocarbon mono- and poly-sulfonic acids and chlorohydrocarbon sulfonic acids having an average of at least 8 carbon atoms in the molecule obtained by reacting a saturated aliphatic hydrocarbon or a mixture of such with admixed sulfur dioxide and chlorine while irradiating the same with actinic light, e. g. light of wave lengths of 2000 to 7600 A. until about one-half of the hydrocarbon has been reacted, and hydrolyzing with a strong alkaline liquid, to convert the sulfonyl chloride groups to sulfonic acid salt groups. The free sulfonic acids obtainable by hydrolysis in neutral or acid solution or by double decomposition from the salts may also be used.

This application is a continuation-in-part of my copending application, Serial No. 216,332. The preparation of the sulfonic acid compounds of this invention is described therein and in my Reissue Patent No. 20,968. The preparation may be accomplished by admixing the saturated hydrocarbon with sulfur dioxide and chlorine, e. g. by bubbling the last-mentioned compounds in gaseous form through the hydrocarbon which is maintained in the liquid state while irradiating the reaction zone with actinic light. The resulting products are then hydrolyzed and neutralized or saponified whereby water soluble salts are formed.

While the mixtures of water-soluble alkaline salts of the reaction products from saturated aliphatic hydrocarbons of at least 6 carbon atoms in general may be used, it has been found that the products obtained from light kerosene mineral oil fractions give the best results in well treating processes, especially for oil wells. Mixtures predominating in hydrocarbon monosulfonic acid salts of alkali metals, ammonia and amines are preferred.

The aqueous acid well treating compositions can be quickly and easily prepared by admixing the water-soluble salts obtained by hydrolysis and neutralization or saponification of the mixture of primary and secondary aliphatic hydrocarbon and chlorohydrocarbon mono- and poly-sulfonyl chlorides with the aqueous mineral acid. While it is generally preferable to make a mixture of the acid and said water-soluble salt, so that the latter may be introduced into the well in a single operation, the process aspects of this invention are not limited to that embodiment. If desired, the salt may be introduced into the well ahead of the acid, in which case they may be mixed together within the confines of the well formation.

While good results are obtained with any water-soluble salts of the above-described character or the free acids themselves containing at least 6 carbon atoms, sodium and potassium salts are most desirable from the standpoint of effectiveness, as well as economy. Mixtures predominating in mono alkali metal sulfonates are likewise preferred. Of course, all these salts will decompose and liberate the free acid as soon as incorporated into the relatively concentrated solution of acid.

The proportion of water-soluble salts of said hydrocarbon and chlorohydrocarbon sulfonic acids varies depending on the particular acid used, the inhibitor and other factors. In general, the amount employed may vary from 0.001% to 5.0%, but preferably about 0.001% to 0.5%, of the weight of the acid charge. Acid concentrations in general may run from about 5% to 25% strength. Any acid capable of attacking and dissolving the earth formation so as to form water-soluble salts therewith and increase its porosity can be used. Hydrochloric acid is eminently suited for the purpose.

The invention will be further illustrated, but is not intended to be limited by the following examples:

Example I

Paraffin wax was heated to 90 to 95° C. to liquefy the same and a mixture of chlorine and sulfur dioxide were bubbled through the liquid. After a gain in weight of 20 to 25% was obtained, the temperature was reduced to between 40 and 50° C. and the gases bubbled in until the product gained another 150% in weight. The resulting product was hydrolyzed and neutralized with an aqueous solution of about 30% strength of caustic soda. To a 15% solution of hydrochloric acid were added about 0.2% by weight of the sodium salts recovered from the above process. The acid solution containing an inhibitor was introduced into an oil, gas, water and brine well and allowed to react for from 6 to 72 hours. The solution had a surface tension of less than 30 dynes which enables better penetration into the earth formation and also assists in the removal of the products of the treatment from such wells.

Example II

Four hundred and fifty parts of a kerosene fraction boiling between 212 and 255° C., with a specific gravity of 0.7817 at 15.5° C. compared to water at 15.5° C. and having a Saybolt Universal viscosity at 100° F. of 32 seconds was treated with a gaseous mixture of 151 parts of sulfur dioxide and 126 parts of chlorine over a period of 65 minutes. The temperature was maintained at 20–25° C. During the reaction, which took place in a thin walled Pyrex flask, the reaction mass was irradiated with the light from a 150-watt General Electric projector flood lamp. The resulting mixture of kerosene sulfonyl chlorides which contained mono- and polysulfonyl chlorides as well as chlorinated sulfonyl chlorides in minor amounts and unreacted kerosene was hydrolyzed in 400 parts of 30% sodium hydroxide solution at 85–95° C. After stirring at this temperature a further 20 minutes the product was slightly alkaline to phenolphthalein. A yield of 987 parts of crude hydrolysis mass was obtained.

The crude hydrolysis mass was then diluted with 444 parts of water and 131 parts of specially denatured ethyl alcohol (2-B). The mixture was warmed to 60–65° C. and poured into a separatory funnel. After standing several hours a clear separation occurred with the unreacted oil on top of the aqueous layer. The lower aqueous layer was withdrawn and weighed 1322 parts. Analysis showed it to contain 22.8% active ingredient as a mixture of hydrocarbon and chlorhydrocarbon sodium sulfonates. The solution was a clear light yellow mobile liquid, and contained a mixture of primary and secondary alkane and chloroalkane mono- and polysulfonic acid sodium salts, predominating in secondary alkane sodium monosulfonates.

When this product, at a concentration of 0.025 per cent, was dissolved in 14% hydrochloric acid the surface tension at 30–35° C. was 27.5 dynes/cm. When the hydrochloric acid was neutralized with calcium hydroxide the surface tension was 28.4 dynes/cm. The product when used in a well treating operation as described in Example I gives excellent results.

Example III

Three hundred parts of a paraffin base mineral oil fraction boiling between 209 and 250° C. and having a specific gravity of 0.7807 at 15.5% C. was treated with a gaseous mixture of 114 parts of sulfur dioxide and 92 parts of chlorine over a period of 45 minutes. The temperature was held at 20–25° C. during the reaction and the reaction mass was irradiated with actinic light. The product of the reaction which was a mixture of hydrocarbon and chlorhydrocarbon mono- and polysulfonyl chlorides and unreacted kerosene was hydrolyzed in 270 parts of 30% sodium hydroxide solution at 85–95° C. and 668 parts of crude hydrolysis mass was obtained. This was diluted with 300 parts of water and 89 parts of 2-B ethyl alcohol and allowed to separate as in the previous example. Eight hundred and ninety parts of a clear yellow aqueous layer were obtained which analyzed 22.3% alkyl sodium sulfonate. When this product was dissolved in 14% hydrochloric acid solution at a concentration of 0.012% the surface tension at 30–35° C. was 29.3 dynes/cm. When the acid was neutralized with calcium hydroxide the surface tension was 29.2 dynes/cm. The product when used in a well treating operation as described in Example I gives excellent results.

A solution of sodium octyl and decyl sulfates containing approximately 35% active ingredient which is used commercially in oil well treating, was subjected to a similar test in acid and then neutralized. At a concentration of 0.30% in 14% hydrochloric acid solution the surface tension at 30–35° C. was 25.8 dynes/cm. and when neutralized with calcium hydroxide was 31.6 dynes/cm. At a concentration of 0.15% in 14% hydrochloric acid solution the surface tension was 27.3 dynes/cm. and when neutralized with calcium hydroxide was 34.0 dynes/cm. Thus, it is apparent that a very great increase in the efficiency of oil well treating has been achieved by the well treating compositions and mixtures of this invention.

The invention is not limited to the use of the particular mixtures of water-soluble salts of the above examples. On the contrary, any of the salts obtainable from saturated hydrocarbons or mixtures of such hydrocarbons having from 6 to 24 and more carbon atoms and more particularly those of the aliphatic type, by the procedures described in application, Serial No. 216,332, Reissue Patent 20,968 and U. S. Patent 2,202,791, can be substituted in like manner. When refined petroleum fractions are used, naphthenes may be present in various proportions. The naphthenes when present are converted to similar mixtures of sulfonic acid salts.

Kerosene fractions, as before stated, represent the preferred hydrocarbon fractions. Any kerosene fraction boiling between 150° and 275° C. when converted to water-soluble alkaline salts give good results in well treating operations. Kerosene fractions having a high percentage of paraffin hydrocarbons are desirable. Kerosene fractions which are highly purified, pass the U. S. P. XI acid wash test, having a boiling range from 210° to 250° C. and consist essentially of alkane hydrocarbons form alkali metal sulfonates by reaction with admixed sulfur dioxide and chlorine and hydrolysis with sodium hydroxide solution which give excellent results in the acid treatment of oil wells.

The ammonium and amine salts can be made from a mixture of the sulfonyl chlorides after the manner described in U. S. Patents 2,202,791 and 2,213,360.

The oil well treating compositions and procedures have the advantage that they are economical and very effective. They may be made from readily available materials by a simple and easy process. Approximately $\frac{1}{10}$ as much of the salts are needed to give the same results as the practical treating composition described above, which has found wide acceptance in the oil well treating field. The products are stable and do not hydrolyze in hydrochloric acid solutions with attendant disadvantages. They present no occupational hazards and can be simply and easily used. The products are compatible with acid inhibitors in general including those mentioned in U. S. Patents 1,957,488 and 1,877,504, diorthotolyl thiourea, sulfurized quinoidine, and the condensation product of aniline, acetaldehyde and carbon bisulfide.

As many apparently widely different embodiments of this invention may be made without departing from the spirit and scope thereof, it is to be understood that the invention is not to be limited except as defined in the appended claims.

I claim:

1. A method of treating a well which comprises introducing therein an aqueous solution of hydrochloric acid of 5 to 25% strength containing from 0.001% to 5.0% by weight of a mixture of alkane-sulfonic acids of at least 6 carbon atoms consisting of primary and secondary alkane sulfonic acids and some chloroalkane sulfonic acids.

2. A method of treating a well which comprises introducing therein an aqueous solution of hydrochloric acid of 5% to 25% strength containing from 0.001% to 0.5% by weight of a mixture of hydrocarbon and chlorhydrocarbon primary and secondary mono- and polysulfonic acids, predominating in the mono-secondary type, obtainable by reacting a refined kerosene hydrocarbon fraction with admixed sulfur dioxide and chlorine while irradiating the reaction zone with actinic light and hydrolyzing the sulfonyl-chloride radicals in the resulting compounds into sulfonic acid groups.

3. A well treating composition comprising an aqueous mineral acid solution containing from 0.001% to 5% by weight of a mixture of alkane and chloroalkane primary and secondary mono- and polysulfonic acids containing at least 6 carbon atoms in the molecule.

4. A well treating composition comprising an aqueous solution of hydrochloric acid of 5% to 25% strength containing from 0.001% to 0.5% by weight of a mixture of hydrocarbon and chlorhydrocarbon primary and secondary mono- and polysulfonic acids, obtainable by reacting a refined kerosene hydrocarbon fraction boiling between 200 and 250° C. with admixed sulfur dioxide and chlorine while irradiating the reaction zone with actinic light and hydrolyzing the sulfonyl-chloride radicals in the resulting compounds into sulfonic acid groups.

5. A well-treated composition comprising an aqueous solution of hydrochloric acid in about 5% to about 25% acid concentration, and about .001% to about .5% of kerosene sulfonic acids having a preponderant amount of saturated aliphatic nuclei of at least six carbon atoms, the purified kerosene fraction from which the sulfonate is made boiling between about 150° C. and 275° C.

CORTES F. REED.

---

CERTIFICATE OF CORRECTION.

Patent No. 2,370,421.

February 27, 1945.

CORTES F. REED.

It is hereby certified that error appears in the printed specification of the above numbered patent requiring correction as follows: Page 2, first column, line 4, for "attaching" read --attacking--; and second column, line 9, Example III, for "15.5% C." read --15.5° C.--; page 3, second column, line 31, claim 5, for "well-treated" read --well-treating--; and that the said Letters Patent should be read with this correction therein that the same may conform to the record of the case in the Patent Office.

Signed and sealed this 5th day of June, A. D. 1945.

Leslie Frazer (Seal)

Acting Commissioner of Patents.

and chlorine and hydrolysis with sodium hydroxide solution which give excellent results in the acid treatment of oil wells.

The ammonium and amine salts can be made from a mixture of the sulfonyl chlorides after the manner described in U. S. Patents 2,202,791 and 2,213,360.

The oil well treating compositions and procedures have the advantage that they are economical and very effective. They may be made from readily available materials by a simple and easy process. Approximately $\frac{1}{10}$ as much of the salts are needed to give the same results as the practical treating composition described above, which has found wide acceptance in the oil well treating field. The products are stable and do not hydrolyze in hydrochloric acid solutions with attendant disadvantages. They present no occupational hazards and can be simply and easily used. The products are compatible with acid inhibitors in general including those mentioned in U. S. Patents 1,957,488 and 1,877,504, diorthotolyl thiourea, sulfurized quinoidine, and the condensation product of aniline, acetaldehyde and carbon bisulfide.

As many apparently widely different embodiments of this invention may be made without departing from the spirit and scope thereof, it is to be understood that the invention is not to be limited except as defined in the appended claims.

I claim:

1. A method of treating a well which comprises introducing therein an aqueous solution of hydrochloric acid of 5 to 25% strength containing from 0.001% to 5.0% by weight of a mixture of alkane-sulfonic acids of at least 6 carbon atoms consisting of primary and secondary alkane sulfonic acids and some chloroalkane sulfonic acids.

2. A method of treating a well which comprises introducing therein an aqueous solution of hydrochloric acid of 5% to 25% strength containing from 0.001% to 0.5% by weight of a mixture of hydrocarbon and chlorhydrocarbon primary and secondary mono- and polysulfonic acids, predominating in the mono-secondary type, obtainable by reacting a refined kerosene hydrocarbon fraction with admixed sulfur dioxide and chlorine while irradiating the reaction zone with actinic light and hydrolyzing the sulfonyl-chloride radicals in the resulting compounds into sulfonic acid groups.

3. A well treating composition comprising an aqueous mineral acid solution containing from 0.001% to 5% by weight of a mixture of alkane and chloroalkane primary and secondary mono- and polysulfonic acids containing at least 6 carbon atoms in the molecule.

4. A well treating composition comprising an aqueous solution of hydrochloric acid of 5% to 25% strength containing from 0.001% to 0.5% by weight of a mixture of hydrocarbon and chlorhydrocarbon primary and secondary mono- and polysulfonic acids, obtainable by reacting a refined kerosene hydrocarbon fraction boiling between 200 and 250° C. with admixed sulfur dioxide and chlorine while irradiating the reaction zone with actinic light and hydrolyzing the sulfonyl-chloride radicals in the resulting compounds into sulfonic acid groups.

5. A well-treated composition comprising an aqueous solution of hydrochloric acid in about 5% to about 25% acid concentration, and about .001% to about .5% of kerosene sulfonic acids having a preponderant amount of saturated aliphatic nuclei of at least six carbon atoms, the purified kerosene fraction from which the sulfonate is made boiling between about 150° C. and 275° C.

CORTES F. REED.

---

CERTIFICATE OF CORRECTION.

Patent No. 2,370,421.

February 27, 1945.

CORTES F. REED.

It is hereby certified that error appears in the printed specification of the above numbered patent requiring correction as follows: Page 2, first column, line 4, for "attaching" read --attacking--; and second column, line 9, Example III, for "15.5% C." read --15.5° C.--; page 3, second column, line 31, claim 5, for "well-treated" read --well-treating--; and that the said Letters Patent should be read with this correction therein that the same may conform to the record of the case in the Patent Office.

Signed and sealed this 5th day of June, A. D. 1945.

Leslie Frazer (Seal)

Acting Commissioner of Patents.